US 011725991B1

United States Patent
Moy et al.

(10) Patent No.: US 11,725,991 B1
(45) Date of Patent: Aug. 15, 2023

(54) SYSTEMS AND METHODS FOR DETERMINING A CONFIDENCE LEVEL OF A SENSOR MEASUREMENT BY A SENSOR OF AN ELECTRIC AIRCRAFT

(71) Applicant: BETA AIR, LLC, South Burlington, VT (US)

(72) Inventors: Nicholas Moy, South Burlington, VT (US); Collin Freiheit, Burlington, VT (US); Joshua E. Auerbach, Waterbury Center, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/688,415

(22) Filed: Mar. 7, 2022

(51) Int. Cl.
*G01K 15/00* (2006.01)
*G01K 3/14* (2006.01)
*B60L 3/00* (2019.01)
*G01K 19/00* (2006.01)
*G01P 21/00* (2006.01)

(52) U.S. Cl.
CPC .............. *G01K 3/14* (2013.01); *B60L 3/0038* (2013.01); *G01K 19/00* (2013.01); *G01P 21/00* (2013.01)

(58) Field of Classification Search
CPC combination set(s) only.
See application file for complete search history.

(56) References Cited

U.S. PATENT DOCUMENTS

| | | | |
|---|---|---|---|
| 5,850,625 A * | 12/1998 | Maren | G01S 13/86 702/179 |
| 7,313,502 B2 | 12/2007 | Schuster et al. | |
| 9,697,465 B2 | 7/2017 | Li et al. | |
| 10,235,875 B2 | 3/2019 | Wieskamp et al. | |
| 10,996,663 B2 | 5/2021 | Gaydos et al. | |
| 11,003,184 B2 | 5/2021 | Magalhães de Matos | |
| 11,346,751 B1 * | 5/2022 | King | G06N 5/04 |
| 2014/0012791 A1 | 1/2014 | Grichnik et al. | |
| 2014/0278183 A1 * | 9/2014 | Zheng | G01C 25/005 702/96 |
| 2017/0261406 A1 * | 9/2017 | Dion | G01M 99/008 |

(Continued)

FOREIGN PATENT DOCUMENTS

EP    2966635 A2 *   1/2016   ............. G01C 23/00

OTHER PUBLICATIONS

Sheila F. O'Brien1,2 and Qi Long Yi1, "How do I interpret a confidence interval?", Transfusion (Philadelphia, Pa.), 2016, vol. 56 (7), p. 1680-1683. (Year: 2016).*

(Continued)

*Primary Examiner* — Lisa M Caputo
*Assistant Examiner* — Nasir U. Ahmed
(74) *Attorney, Agent, or Firm* — Caldwell Intellectual Property Law (57) ABSTRACT

Provided in this disclosure are systems and methods for determining a confidence level of a sensor measurement of a sensor. A system may include a sensor array, which includes a plurality of sensors configured to detect a physical phenomenon. Each sensor of the sensor array may generate an output signal that includes measurement datum related to the detected physical phenomenon, which may be received by a controller of the system. Controller may compare the measurement datum from a selected sensor to other sensors of the sensor array to determine the confidence level of the selected sensor.

17 Claims, 6 Drawing Sheets

(56) References Cited

U.S. PATENT DOCUMENTS

| | | |
|---|---|---|
| 2018/0284737 A1 | 10/2018 | Cella et al. |
| 2019/0342322 A1 | 11/2019 | Boulton |
| 2020/0278665 A1 | 9/2020 | Arditti Ilitzky et al. |
| 2021/0044923 A1* | 2/2021 | Kim ........................ H04W 4/48 |
| 2021/0088247 A1* | 3/2021 | Kriss ........................ F25D 29/00 |
| 2022/0113742 A1* | 4/2022 | Saunders ............... B64D 47/08 |

OTHER PUBLICATIONS

Nicolas Pous, Denis Gingras, and Dominique Gruyer, Intelligent Vehicle Embedded Sensors Fault Detection and Isolation Using Analytical Redundancy and Nonlinear Transformations, Jan. 16, 2017.

\* cited by examiner

SYSTEMS AND METHODS FOR DETERMINING A CONFIDENCE LEVEL OF A SENSOR MEASUREMENT BY A SENSOR OF AN ELECTRIC AIRCRAFT

FIELD OF THE INVENTION

The present invention generally relates to the field of electric aircrafts. In particular, the present invention is directed to systems and methods for determining a confidence level of a sensor measurement by a sensor of an electric aircraft.

BACKGROUND

The burgeoning of electric aircraft technologies promises an unprecedented forward leap in energy efficiency, cost savings, and the potential of future autonomous and unmanned vehicles. However, for reliable operation of an electric aircraft, accurate readings related to corresponding systems and a surrounding environment are crucial.

SUMMARY OF THE DISCLOSURE

In an aspect, a system for determining a confidence level of a sensor measurement by a sensor of an electric aircraft is provided. The system includes: a sensor array attached to an electric aircraft and comprising a plurality of sensors, wherein each sensor of the sensor array is configured to: detect a physical phenomenon; and transmit a measurement datum related to the physical phenomenon; and a controller, wherein the controller is configured to: receive the measurement datum from each sensor of the sensor array; and determine a confidence level of a first sensor of the sensor array by comparing a measurement datum of the first sensor of the sensor array to each measurement datum of the other sensors of the sensor array.

In an aspect, a method for determining a confidence level of a sensor measurement by a sensor of an electric aircraft is provided. The method includes: detecting, by a plurality of sensors of a sensor array that is attached to an electric aircraft, a physical phenomenon; and transmitting, by each sensor of the sensor array, a measurement datum related to the physical phenomenon; receiving, by a controller of the electric aircraft, the measurement datum from each sensor of the sensor array; and determining, by the controller, a confidence level of each sensor of the sensor array by comparing a measurement datum of each sensor of the sensor array to a measurement datum of the other sensors of the sensor array.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

Provided in this disclosure are systems and methods for determining a confidence level of a sensor measurement by a sensor of an electric aircraft. More specifically, provided in this disclosure are systems and methods for determining a confidence level of a sensor measurement of a sensor. A system may include a sensor array, which includes a plurality of sensors configured to detect a physical phenomenon. Each sensor of the sensor array may generate an output signal, which includes measurement datum related to the detected physical phenomenon. Such measurement datum may be received by a controller of the system. A controller may compare the measurement datum from each sensor to one selected sensor to determine the confidence level of the selected sensor. Thus, an operator of an electric aircraft, such as an electric aircraft, may ascertain the accuracy of a sensor measurement taken by a sensor of the array and provided to the operator.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Figure 1:
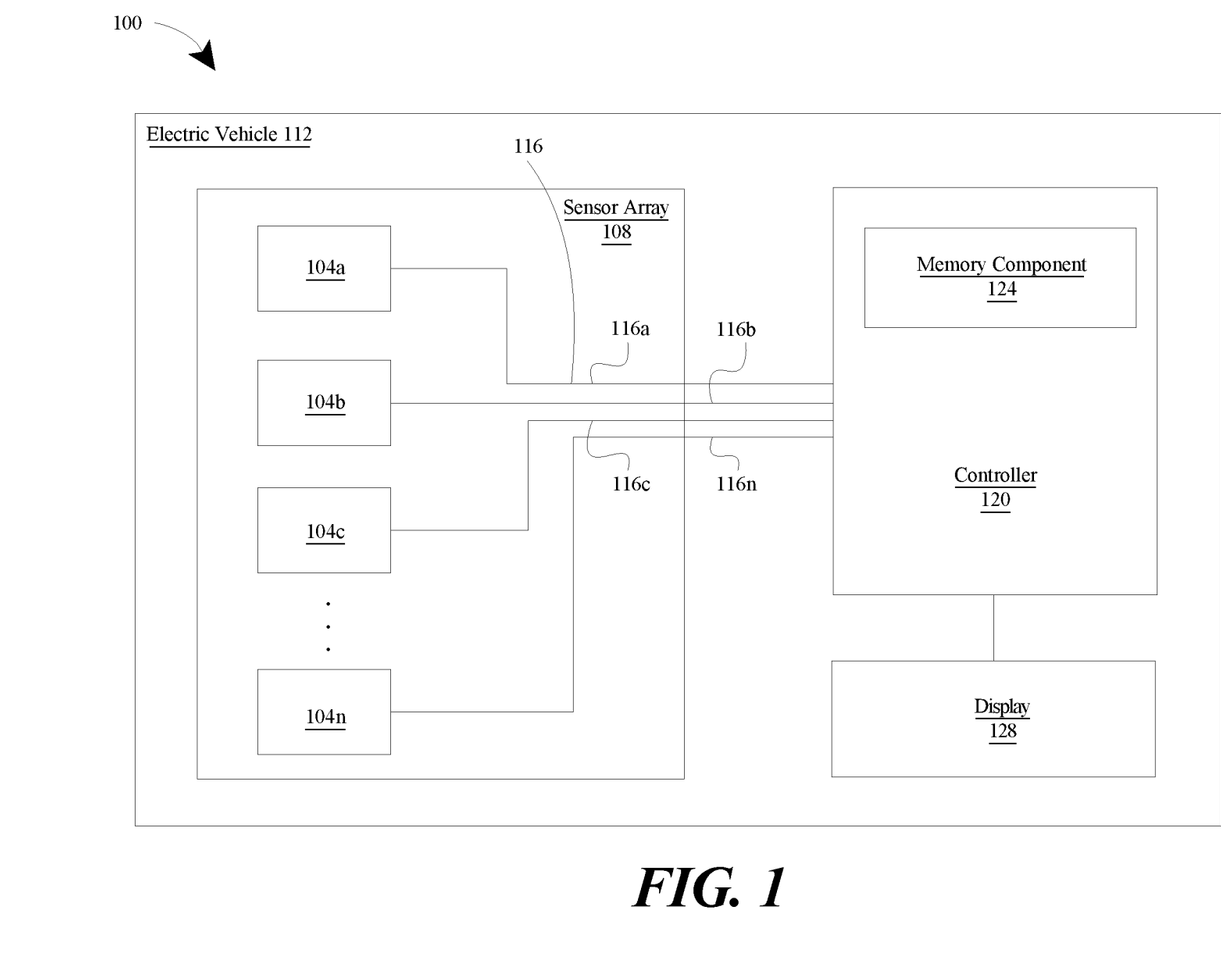
FIG. 1 is a block diagram of an exemplary embodiment of a system for determining a confidence level of a sensor measurement by a sensor in one or more aspects of the present disclosure.

Referring now to FIG. 1, a system 100 for determining a confidence level of a sensor measurement by a sensor, such as a sensor 104a-n of sensor array 108, of an electric aircraft 112 is shown in accordance with one or more embodiments of the present disclosure. In one or more embodiments, system 100 includes sensor array 108, which includes a plurality of sensors 104*a-n*. In one or more embodiments, each sensor 104*a-n* of sensor array 108 is configured to detect a physical phenomenon, such as a characteristic or event. More, specifically each sensor 104*a-n* of sensor array 108 may detect the same physical phenomenon. For the purposes of this disclosure, a "physical phenomenon" is a sensor measurement related to a parameter of a physical characteristic and/or event. For instance, and without limitation, sensor 104*a-n* may detect an environmental phenomenon, such as weather. In another instance, sensor 104*a-n* may detect a physical state or an electrical characteristic of an electric vehicle and/or a component thereof, such as a power source. In an exemplary embodiments, a state of a battery pack of an electric vehicle may be detected by sensor array 108. A state of a battery pack may include detectable information related to, for example, a state of charge (SOC), depth of discharge (DOD), temperature, a moisture level, a humidity, a voltage, a current, vent gas, vibrations, chemical content, or other measurable phenomenon of the battery pack and/or components thereof, such as a battery module and/or a battery cell.

As used in this disclosure, a "sensor" is a device that is configured to detect a phenomenon and transmit information and/or datum related to the detection of the phenomenon. For instance, and without limitation, a sensor may transform an electrical and/or nonelectrical stimulation into an electrical signal that is suitable to be processed by an electrical circuit, such as a controller. A sensor may generate a sensor output signal, which transmits information and/or datum related to a detection by the sensor. A sensor output signal may include any signal form described in this disclosure, such as for example, digital, analog, optical, electrical, fluidic, and the like. In some cases, a sensor, a circuit, and/or a controller may perform one or more signal processing steps on a signal. For instance, a sensor, circuit, and/or controller may analyze, modify, and/or synthesize a signal in order to improve the signal, for instance by improving transmission, storage efficiency, or signal to noise ratio.

In one or more embodiments, system 100 may include a plurality of sensor arrays 108, where each sensor array 108 includes a plurality of sensors 104*a-n* configured to detect a specific physical characteristic. For example, and without limitation, each sensor of a first sensor array may be configured to detect a first physical phenomenon, such as a humidity level of a battery pack of an electric aircraft, while each sensor of a second sensor array may be configured to detect a second physical phenomenon, such as an altitude of the electric vehicle during operation, such as flight. One of ordinary skill in the art would understand that the terms "first" and "second" do not refer to either sensor array as primary or secondary. In non-limiting embodiments, the first and second arrays, due to their physical isolation, may be configured to withstand malfunctions or failures in the other system and survive and operate. In one or more embodiments, the plurality of sensors 104*a-n* may be located within a close proximity to each other. In other embodiments, each sensor 104*a-n* may be remote to the other sensors of sensor array 108. For example, each sensor 104*a-n* may be positioned in a different location from the other sensors of sensor array 108. Positioning sensors 104*a-n* remotely from each other holds a benefit of avoiding the same environmental error affecting all the sensors of the sensory array. For example, and without limitation, if one sensor is short circuiting due to contacting a hot wire, the other sensors will not be affected by the malfunctioning sensor and may be able to better detect the malfunctioning sensor when determining the confidence level of the malfunctioning sensor.

In one or more embodiments, sensors 104*a-n* of sensor array 108 may be physically isolated from each other. "Physical isolation", for the purposes of this disclosure, refers to a first system's components, communicative connection, and/or any other constituent parts, whether software or hardware, are separated from a second system's components, communicative connection, and any other constituent parts, whether software or hardware, respectively. In one or more embodiments, each sensor 104*a-n* may perform the same function and measure the same physical phenomenon as the other sensors of sensor array 108. Each sensor 104*a-n* of sensor array 108 may be the same type of sensor as the other sensors of sensor array 108 or each sensor 104*a-n* may be a different type of sensor that measures the same physical phenomenon as the other sensors of sensor array 108. For example, and without limitation, each sensor of a sensor array may include a thermometer. In another embodiment, sensors of a sensor array may include a thermometer, thermistor, infrared sensor, and the like.

Still referring to FIG. 1, sensors 104*a-n* may be electrically isolated from each other. "Electrical isolation", for the purposes of this disclosure, refers to a first system's separation of components carrying electrical signals or electrical energy from a second system's components. Thus, if one sensor of sensor array 108 malfunctions or suffers an electrical catastrophe, rendering it inoperable or inaccurate, due to electrical isolation, the other sensors may still continue to operate and function normally, allowing for continued detection of physical phenomenon of the electric vehicle and/or components thereof. Shielding structural components, material selection, a combination thereof, or another undisclosed method of electrical isolation and insulation may be used in non-limiting embodiments. For example, and without limitation, a rubber or other electrically insulating material component may be disposed between electrical components of each sensor 104*a-n*, preventing electrical energy to be conducted through it, isolating each sensor 104*a-n* from each other.

Still referring to FIG. 1, each sensor 104*a-n* of sensor array 108 is configured to transmit a measurement datum related to the detected physical phenomenon. In one or more embodiments, each sensor 104*a-n* may generate a sensor output signal that includes information and/or datum related to the detected event and/or phenomenon, such as, for example, measurement datum 116*a-n* of sensors 104*a-n* respectively. For the purposes of this disclosure, "measurement datum" is an electronic signal representing information and/or datum of a detected physical phenomenon associated with an electric vehicle. For example, and without limitation, measurement datum may include data of a condition parameter regarding a detected temperature of a battery cell. In another example, and without limitation, measurement datum may include data of an environmental condition, such as wind forces experienced by an electric aircraft during flight. In one or more embodiments, measurement datum may include a state of charge (SOC) of a battery pack of electric vehicle 112, a depth of discharge (DOD) of a battery pack of electric vehicle 112, a temperature reading of one or more components of electric vehicle 112, a moisture/humidity level of a component of electric vehicle and/or of an environment surrounding electric vehicle 112, a gas level of a battery pack of electric vehicle 112, a chemical level of a battery pack of electric vehicle 112, a voltage of a component of the electric vehicle 112, a current of a component of electric vehicle 112, a pressure of a component of electric vehicle 112 and/or of an environment of electric vehicle 112, and the like.

Still referring to FIG. 1, system 100 includes a controller 120 that is communicatively connected to each sensor 104a-n and/or sensor array 108. As used herein, "communicatively connected" is a process whereby one device, component, or circuit is able to receive data from and/or transmit data to another device, component, or circuit. In an embodiment, communicative connecting includes electrically connecting at least an output of one device, component, or circuit to at least an input of another device, component, or circuit. For example, and without limitation, each sensor 104a-n may be communicatively connected to controller 120. In one or more embodiments, a communicative connection between controller 120 and sensor array 108 may be wireless and/or wired. For example, and without limitation, controller 120 and sensor array 108 may communicative via a controller area network (CAN) communication. In one or more embodiments, controller 120 may include a computing device (as discussed in FIG. 6), a central processing unit (CPU), a microprocessor, a digital signal processor (DSP), an application specific integrated circuit (ASIC), a control circuit, a combination thereof, or the like. In one or more embodiments, output signals from sensors 104a-n and/or controller 120 of system 100 may be analog or digital. Controller 120 may convert output signals from each sensor 104a-n to a usable form by the destination of those signals. The usable form of output signals from sensors 104a-n and through controller 120 may be either digital, analog, a combination thereof, or an otherwise unstated form. Processing by controller 120 may be configured to trim, offset, or otherwise compensate the outputs of sensors. Based on output of the sensors, controller 120 may determine the output to send to a downstream component. Controller 120 may include signal amplification, operational amplifier (Op-Amp), filter, digital/analog conversion, linearization circuit, current-voltage change circuits, resistance change circuits such as Wheatstone Bridge, an error compensator circuit, a combination thereof or otherwise undisclosed components.

In one or more embodiments, controller 120 may include a memory component 124. In one or more embodiments, memory component 124 may be configured to store datum related to sensor array 108, such as measurement datum 116a-n from each of sensors 104a-n. For example, and without limitation, memory component 124 may store measurement datum and/or a confidence level of each sensor, as discussed further in this disclosure. In one or more embodiments, memory component 124 may include a database. In one or more embodiments, memory component 124 may include a solid-state memory or tape drive. In one or more embodiments, memory component 124 may be communicatively connected to sensors 104a-n and/or sensor array 108 and may be configured to receive electrical signals related to detected physical phenomenon and store such data for use and/or recall by controller 120 at a later time. Alternatively, memory component 124 may include a plurality of discrete memory components that are physically and/or electrically isolated from each other. One of ordinary skill in the art would understand the virtually limitless arrangements of data stores with which controller 120 could employ to store sensor data, such as measurement datum from each sensor 104a-n, and/or controller data.

In one or more embodiments, memory component 124 may be configured to save measurement datum 116a-n, a predetermine threshold for one of more types of sensors, a confidence level of one or more sensors of one or more sensor arrays, and the like periodically in regular intervals to memory component 124. "Regular intervals", for the purposes of this disclosure, refers to an event taking place repeatedly after a certain amount of elapsed time. In one or more embodiments, controller 120 may include a timer that works in conjunction to determine regular intervals. In other embodiments, controller 120 may continuously update a confidence level of sensor 104a-n and, thus, continuously store data related the information in memory component 124. A timer may include a timing circuit, internal clock, or other circuit, component, or part configured to keep track of elapsed time and/or time of day. For example, in non-limiting embodiments, memory component 124 may save a confidence level of a sensor every 30 seconds, every minute, every 30 minutes, or another time period according to a timer. Additionally or alternatively, memory component 124 may save sensor data, such as measurement data and/or a confidence level, after certain events occur, for example, in non-limiting embodiments, each power cycle, landing of the electric aircraft, when battery pack is charging or discharging, a failure of a battery cell, a malfunction of a sensor and/or sensor array, or scheduled maintenance periods. In non-limiting embodiments, measurement datum of each sensor may be continuously transmitted to controller 120 and stored at an intermediary storage location, and then permanently saved by memory component 124 at a later time, like at a regular interval or after an event has taken place as mentioned previously.

In one or more embodiments, controller 120 is configured to receive the measurement datum 116 from each sensor 104a-n of sensor array 108. For example, and without limitation, controller 120 may receive measurement datum 116a-n, such as a humidity level of the environment surrounding electric vehicle 112, from each sensor 104a-n of sensor array 108. In one or more embodiments, controller 120 may receive measurement datum 116a-n from each sensor 104a-n of sensor array 108 via various types of communication. For example, and without limitation, controller 120 may receive measurement datum from a sensor via an isoSPI transceiver. In another example, controller 120 may receive measurement datum from a sensor via a controller area network (CAN) as discussed further in this disclosure.

Still referring to FIG. 1, controller 120 is configured to determine a confidence level of sensor 104a-n of sensor array 108 and corresponding measurement datum 116a-n by comparing a measurement datum 116a-n of each sensor 104a-n of sensor array 108 to a measurement datum 116a-n of other sensors 104a-n of sensor array 108. For instance, and without limitation, each received measurement datum 116a-n from each sensor 104a-n may include a quantitative and/or qualitative value representing a detected physical phenomenon related to electric vehicle 112; controller 120 may then compare each measurement datum 116a-n of a sensor 104a-n to the measurement datum of all the other sensors 104a-n. For example, and without limitation, controller 120 may receive measurement datum 116a-n from each sensor 104a-n of sensor array 108, and then controller 120 may compare the measurement datum from a first sensor 104a to each measurement datum 116 of the other sensors 104b-n. In an embodiment, controller 120 may compare the average of the other sensors 104b-n to first sensor 104a to determine by what amount first sensor 104a deviates from the other sensors 104b-n. In another embodiment, controller 120 may compare each individual measurement datum from each sensor to a first sensor. For example, and without limitation, a first sensor 104*b* may detect a physical phenomenon of a temperature of a battery cell of a battery pack of electric vehicle 112. The corresponding measurement datum of first sensor 104*a* may include a temperature reading of 75° F. Controller 120 may receive measurement datum from each of the remaining sensors 104*b-n* that averages 95° F. Therefore, controller 120 may determine a low confidence level of first sensor 104*a* since the reading from first sensor 104*a* substantially deviates from the average reading of the other sensors 104*b-n*. In one or more embodiments, controller 120 may continue to compare measurement datum from each sensor to all of the other sensors until a confidence level is determined for each individual sensor of sensor array. For the purposes of this disclosure, a "confidence level" is a representation of a certainty and/or accuracy of a sensor measurement of a sensor. Confidence level may be expressed as a numerical range or as a best estimate margin of error. For instance, and without limitation, a confidence level of a sensor may be represented by a numerical value ranging between 0% and 100%. For example, and without limitation, a sensor output of a sensor with a confidence level of 99% may be considered highly certain and thus reliable. Contrastingly, a sensor output of a sensor with a confidence level of 5% may be considered highly uncertain and thus unreliable. As a result, the sensor may be considered a malfunctioning sensor, as discussed further below in this disclosure. In a non-limiting embodiment, a pilot operating an electric aircraft may need to know the pitch of the electric aircraft to properly execute a desired maneuver; thus, the pilot may want to know a measurement datum of an orientation of the electric aircraft body from a sensor and know the accuracy of the measurement datum to confidently execute the maneuver in reliance of the provided measurement datum by the sensor.

In one or more embodiments, a confidence level may include a confidence interval (CI), where a plurality of measurement data taken by the same sensor over a range of time is compared to determine a confidence interval (CI). For example, and without limitation, a measurement datum from a sensor 104*a-n* of sensor array 108 may be taken every second over a span of one minute. The values of the measurement datum may be compared to determine if the sensor is consistent and thus operational, or if the sensor is malfunctioning. In one or more embodiments, controller 120 may use a combination of processes mentioned in this disclosure to determine the confidence level of a sensor.

In one or more embodiments, controller 120 may identify a state of sensor 104*a-n* as a function of a confidence level of sensor 104*a-n*. Confidence level may act as a threshold. As used in this disclosure, a "threshold" is a limit and/or range of an acceptable quantitative value or representation related to a normal phenomenon. In one or more embodiments, a state of a sensor is an operating condition of a sensor. For example, a sensor state may be "malfunctioning" or "operational". For instance, and without limitation, if a confidence level of a sensor 104*a-n* exceeds a predetermined threshold, sensor 104*a-n* may be identified as a malfunctioning and/or malfunctioning sensor. In other embodiments, if a confidence level of a sensor 104*a-n* is within a predetermined threshold, sensor 104*a-n* may be identified as a properly operating and/or operational sensor. In one or more embodiments, if the confidence level of a sensor 104*a-n* is outside a predetermined threshold, then controller 120 may determine sensor 104*a-n* is malfunctioning and subsequently notify a user via, for example, display 128. For instance, and without limitation, an alert may be transmitted to a display 128 for viewing of measurement datum and/or a confidence level by a user. For example, and without limitation, an alert may be shown on an electric user interface, such as a control panel, of electric aircraft 112, or on a remote device, such as a mobile device, a laptop, a tablet, or the like. In one or more embodiments, the alert cannot be removed until the malfunctioning sensor is repaired or replaced with an operational sensor, where an operational sensor is one that has a confidence level within the predetermined threshold. In other embodiments, a user may deactivate the malfunctioning sensor in response to the determined confidence level and the identified exceeded threshold. In one or more embodiments, controller 120 may be continuously determining the confidence level of one or more sensors of sensor array 108. In other embodiments, controller 120 may determine the confidence level of one or more sensors of sensor array 108 at discrete time intervals.

In a non-limiting exemplary embodiment, if sensors 104*a-n* are like sensors then a mean of the sensors may be taken to determine the confidence level of a selected sensor. For example, and without limitation, if a selected sensor is first sensor 104*a*, controller 120 may determine the confidence level of sensor 104*a* by taking the average of the other sensors 104*b-n* and comparing measurement datum from first sensor 104*a* to the average of the measurement data from other sensors 104*b-n*. A predetermined threshold may include two standard deviations from identified average of the other sensors 104*b-n*. Thus, is the measurement datum of first sensor 104*a* is within two standard deviations of the average of the measurement datum of other sensors 104*b-n*, sensor 104*a* is within the threshold and has an acceptable confidence level. If the measurement datum of first sensors 104*a* is outside of two standard deviations of the average of the measurement datum of the other sensors 104*b-n*, then the confidence level of first sensor 104*a* is identified as unacceptable and a user will be alerted that first sensor 104*a* is malfunctioning.

In another non-limiting exemplary embodiment, for instance and without limitation if sensors 104*a-n* include various types of sensors measuring the same physical phenomenon then a machine-learning module may be used to determine the confidence level of a selected sensor and whether the determined sensor confidence level falls within an acceptable operational value. For example, and without limitation, a machine-learning module and/or process may use a training data set, which includes training data, to generate an algorithm and create a machine-learning model that can determine a confidence level for various types of sensors based on measurement datum. Training data may include inputs and corresponding predetermined outputs so that a machine-learning module may use the correlations between the provided exemplary inputs and outputs to develop an algorithm and/or relationship that then allows the machine-learning module to determine its own outputs for inputs. Training data may contain correlations that a machine-learning process may use to model relationships between two or more categories of data elements. The exemplary inputs and outputs may come from a database or be provided by a user. In other embodiments, a machine-learning module may obtain a training set by querying a communicatively connected database that includes past inputs and outputs. Training data may include inputs from various types of sensors and outputs correlated to each of those inputs so that a machine-learning module may determine an output for any type of sensor used in sensor array 108. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements.

In one or more embodiments, training data may be filtered, sorted, and/or selected using one or more supervised and/or unsupervised machine-learning processes and/or models, as described in further detail below. Such models may include a training data classifier. A training data classifier may include a mathematical model, neural net, or program generated by a machine learning algorithm that sorts inputs into categories or bins of data and, subsequently, outputs the categories or bins of data and/or labels associated therewith. A classifier may be configured to output at least a datum that labels or otherwise identifies a set of data that are clustered together, found to be close under a distance metric as described below, or the like. For example, and without limitation, a measurement datum may be classified and sorted based on the type of sensor that detects the corresponding physical phenomenon and/or based on the unit and/or type of measurement datum generated. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Figure 2:
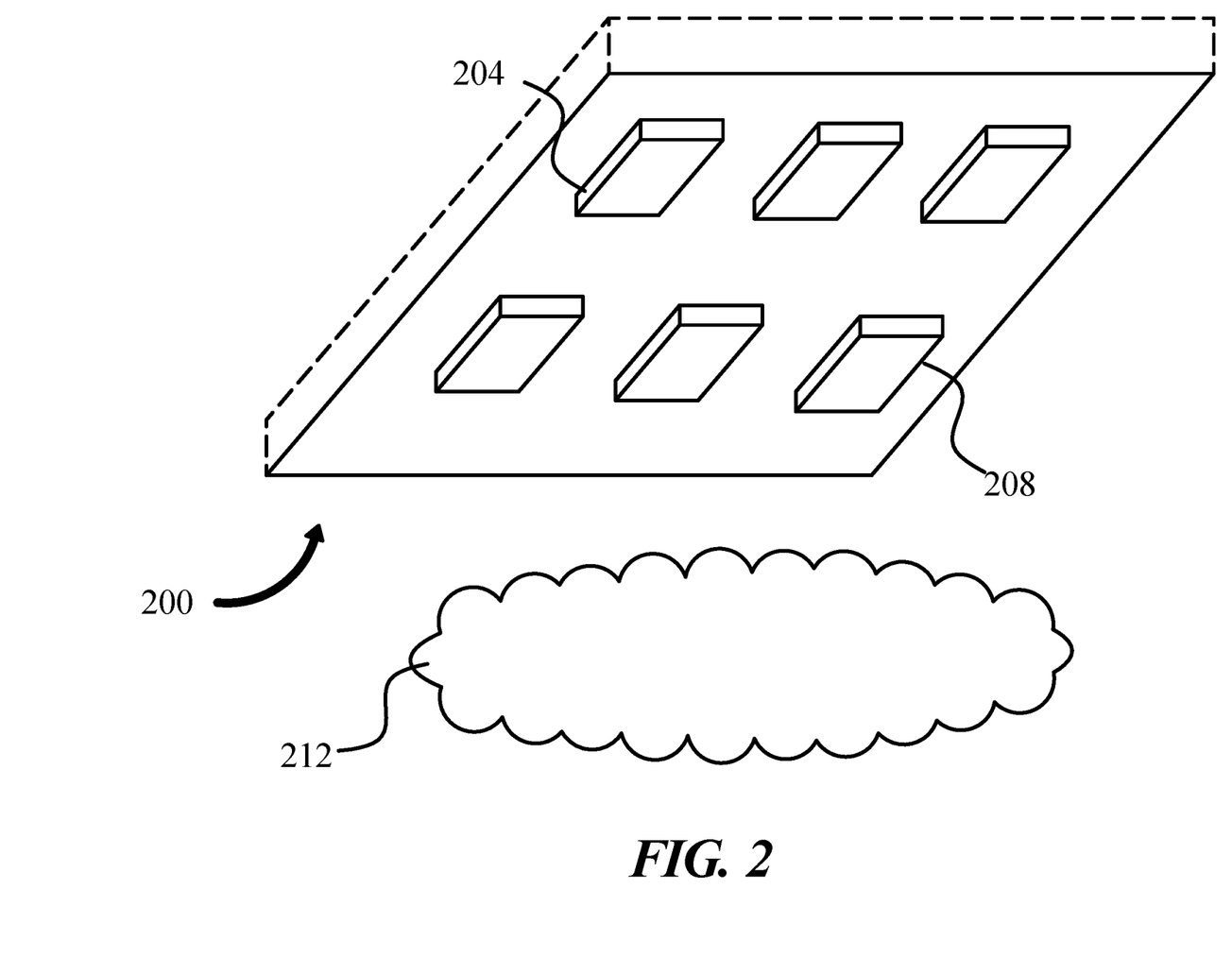
FIG. 2 is an illustration of an exemplary embodiment of a sensor suite in partial cut-off view in one or more aspects of the present disclosure.

Referring now to FIG. 2, an embodiment of a sensor suite 200 is presented in accordance with one or more embodiments of the present disclosure. The herein disclosed systems and methods may comprise a plurality of sensors in the form of individual sensors or a sensor suite working in tandem or individually. A sensor suite may include a sensor array having a plurality of independent sensors, as described in this disclosure, where any number of the described sensors may be used to detect any number of physical quantities associated with an electric vehicle. For example, sensor suite may include a plurality of sensor arrays where each sensor array includes a plurality of sensors detecting the same physical phenomenon. Independent sensors may include separate sensors measuring physical or electrical quantities that may be powered by and/or in communication with circuits independently, where each may signal sensor output to a control circuit such as a user graphical interface. In a non-limiting example, there may be four independent sensors housed in and/or on electric vehicle 112 and/or components thereof, such as battery pack of electric aircraft, measuring temperature, electrical characteristic such as voltage, amperage, resistance, or impedance, or any other parameters and/or quantities as described in this disclosure. In one or more embodiments, use of a plurality of independent sensors may also result in redundancy configured to employ more than one sensor that measures the same phenomenon, those sensors being of the same type, a combination of, or another type of sensor not disclosed, to detect a specific characteristic and/or phenomenon.

Sensor suite 200 may include a plurality of sensor arrays 108 that each have a plurality of independent sensors 104a-n (shown in FIG. 1). In one or more embodiments, sensor suite 200 may include a sensor array of moisture sensors 204. "Moisture", as used in this disclosure, is the presence of water, this may include vaporized water in air, condensation on the surfaces of objects, or concentrations of liquid water. Moisture may include humidity. "Humidity", as used in this disclosure, is the property of a gaseous medium (almost always air) to hold water in the form of vapor. An amount of water vapor contained within a parcel of air can vary significantly. Water vapor is generally invisible to the human eye and may be damaging to electrical components. There are three primary measurements of humidity, absolute, relative, specific humidity. "Absolute humidity," for the purposes of this disclosure, describes the water content of air and is expressed in either grams per cubic meters or grams per kilogram. "Relative humidity", for the purposes of this disclosure, is expressed as a percentage, indicating a present stat of absolute humidity relative to a maximum humidity given the same temperature. "Specific humidity", for the purposes of this disclosure, is the ratio of water vapor mass to total moist air parcel mass, where parcel is a given portion of a gaseous medium. An exemplary moisture sensor may include a psychrometer. Another exemplary moisture sensor may include a hygrometer. Another moisture sensor may include a humidistat. A "humidistat", for the purposes of this disclosure, is a humidity-triggered switch, often used to control another electronic device. In one or more embodiments, a moisture sensor may use capacitance to measure relative humidity and include, in itself or as an external component, a device to convert relative humidity measurements to absolute humidity measurements. "Capacitance", for the purposes of this disclosure, is the ability of a system to store an electric charge in, for example, a parcel of air.

With continued reference to FIG. 2, sensor suite 200 may include a sensor array of electrical sensors 208. An electrical sensor may be configured to measure a voltage across a component, electrical current through a component, and resistance of a component. In one or more non-limiting embodiments, an electrical sensor may include a voltmeter, ammeter, ohmmeter, and the like. Alternatively or additionally, sensor suite 200 may include a plurality of sensors that may detect voltage and direct the charging of individual battery cells of a battery pack of an electric aircraft according to charge level. Detection may be performed using any suitable component, set of components, and/or mechanism for direct or indirect measurement and/or detection of voltage levels, including without limitation comparators, analog to digital converters, any form of voltmeter, or the like. Sensor suite 200 and/or a control circuit incorporated therein and/or communicatively connected thereto may be configured to adjust charge to one or more battery cells as a function of a charge level and/or a detected parameter. For instance, and without limitation, sensor suite 200 may be configured to determine that a charge level of a battery cell is high based on a detected voltage level of that battery cell or portion of the battery pack. Sensor suite 200 may alternatively or additionally detect a charge reduction event, defined for purposes of this disclosure as any temporary or permanent state of a battery cell requiring reduction or cessation of charging; a charge reduction event may include a cell being fully charged and/or a cell undergoing a physical and/or electrical process that makes continued charging at a current voltage and/or current level inadvisable due to a risk that the cell will be damaged, will overheat, or the like. Detection of a charge reduction event may include detection of a temperature, of the cell above a threshold level, detection of a voltage and/or resistance level above or below a threshold, or the like.

With continued reference to FIG. 2, sensor suite 200 may include a sensor array of temperature sensors. In one or more embodiments, temperature sensors may include thermocouples, thermistors, thermometers, passive infrared sensors, resistance temperature sensors (RTDs), semiconductor based integrated circuits (IC), and the like. "Temperature", for the purposes of this disclosure, and as would be appreciated by someone of ordinary skill in the art, is a measure of the heat energy of a system. Temperature, as measured by any number or combinations of sensors present within sensor suite 200, may be measured in Fahrenheit (° F.), Celsius (° C.), Kelvin (° K), or another scale alone, or in combination.

With continued reference to FIG. 2, sensor suite 200 may include a sensor array of gas sensors. In one or more embodiments, gas sensors may be configured to detect gas that may be emitted during or after a cell failure of a battery cell of an electric vehicle. "Cell failure", for the purposes of this disclosure, refers to a malfunction of a battery cell, which may be an electrochemical cell, that renders the cell inoperable for its designed function, namely providing electrical energy to at least a portion of an electric vehicle. Byproducts 212 of cell failure may include gaseous discharge including oxygen, hydrogen, carbon dioxide, methane, carbon monoxide, a combination thereof, or another undisclosed gas, alone or in combination. A sensor configured to detect vent gas from electrochemical cells may comprise a gas detector. For the purposes of this disclosure, a "gas detector" is a device used to detect a gas is present in an area. Gas detectors, and more specifically, the gas sensor that may be used in sensor suite 200, may be configured to detect combustible, flammable, toxic, oxygen depleted, a combination thereof, or another type of gas alone or in combination. A gas sensor may include a combustible gas, photoionization detectors, electrochemical gas sensors, ultrasonic sensors, metal-oxide-semiconductor (MOS) sensors, infrared imaging sensors, a combination thereof, and the like. In one or more embodiments, sensor suite 200 may include sensor arrays of sensors that are configured to detect non-gaseous byproducts of cell failure including, in non-limiting examples, liquid chemical leaks, including aqueous alkaline solution, ionomer, molten phosphoric acid, liquid electrolytes with redox shuttle and ionomer, and salt water, among others. Sensor suite 200 may include sensors that are configured to detect non-gaseous byproducts of cell failure including, in non-limiting examples, electrical anomalies as detected by any of the previous disclosed sensors or components.

In one or more embodiments, sensor suite 200 may include a sensor array having an inertial measurement unit (IMU). In one or more embodiments, an IMU may be configured to detect a change in specific force of a body. An IMU may include an accelerometer, a gyro sensor, a gyroscope, a magnetometer, an E-compass, a G-sensor, a geomagnetic sensor, and the like. In one or more embodiments, IMU may include a global positioning system (GPS) or other positioning sensors. For example, and without limitation, an IMU may detect a geographical position and/or orientation of an electric vehicle relative to the surface of the earth.

Still referring to FIG. 1, a sensor suite 200 may include a sensor array having a plurality of motion sensors. A "motion sensor", for the purposes of this disclosure, refers to a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. Sensor 108 may include, torque sensor, gyroscope, accelerometer, magnetometer, inertial measurement unit (IMU), pressure sensor, force sensor, proximity sensor, displacement sensor, vibration sensor, or the like. For example, without limitation, a sensor may include a gyroscope that is configured to detect a current aircraft orientation, such as roll angle.

In one or more embodiments, sensor suite 200 may include a sensor array having a plurality of weather sensors. In one or more embodiments, sensor may include a wind sensor. In some embodiments, a wind sensor may be configured to measure a wind datum. A "wind datum" may include data of wind forces acting on an aircraft. Wind datum may include wind strength, direction, shifts, duration, or the like. For example, and without limitations, sensor may include an anemometer. An anemometer may be configured to detect a wind speed. In one or more embodiments, the anemometer may include a hot wire, laser doppler, ultrasonic, and/or pressure anemometer. In some embodiments, sensor 108 may include a pressure sensor. "Pressure", for the purposes of this disclosure and as would be appreciated by someone of ordinary skill in the art, is a measure of force required to stop a fluid from expanding and is usually stated in terms of force per unit area. The pressure sensor that may be included in sensor suite 200 may be configured to measure an atmospheric pressure and/or a change of atmospheric pressure. In some embodiments, the pressure sensor may include an absolute pressure sensor, a gauge pressure sensor, a vacuum pressure sensor, a differential pressure sensor, a sealed pressure sensor, and/or other unknown pressure sensors or alone or in a combination thereof. In one or more embodiments, a pressor sensor may include a barometer. In some embodiments, a pressure sensor may be used to indirectly measure fluid flow, speed, water level, and altitude. In some embodiments, the pressure sensor may be configured to transform a pressure into an analogue electrical signal. In some embodiments, the pressure sensor may be configured to transform a pressure into a digital signal.

In one or more embodiments, a sensor may include an altimeter that may be configured to detect an altitude of, for example, an electric aircraft. In some embodiments, the altimeter may include a pressure altimeter. In other embodiments, the altimeter may include a sonic, radar, and/or Global Positioning System (GPS) altimeter. In some embodiments, sensor may include a meteorological radar that monitors weather conditions. In some embodiments, sensor may include a ceilometer. The ceilometer may be configured to detect and measure a cloud ceiling and cloud base of an atmosphere. In some embodiments, the ceilometer may include an optical drum and/or laser ceilometer. In some embodiments, sensor may include a rain gauge. The rain gauge may be configured to measure precipitation. Precipitation may include rain, snow, hail, sleet, or other precipitation forms. In some embodiments, the rain gauge may include an optical, acoustic, or other rain gauge. In some embodiments, sensor may include a pyranometer. The pyranometer may be configured to measure solar radiation. In some embodiments, the pyranometer may include a thermopile and/or photovoltaic pyranometer. The pyranometer may be configured to measure solar irradiance on a planar surface. In some embodiments, sensor may include a lightning detector. The lightning detector may be configured to detect and measure lightning produced by thunderstorms.

In some embodiments, sensor may include a present weather sensor (PWS). The PWS may be configured to detect the presence of hydrometeors and determine their type and intensity. Hydrometeors may include a weather phenomenon and/or entity involving water and/or water vapor, such as, but not limited to, rain, snow, drizzle, hail and sleet. In some embodiments, sensor 108 may include an inertia measurement unit (IMU). The IMU may be configured to detect a change in specific force of a body.

In one or more embodiments, sensor suite 200 may include a sensor array having a plurality of local sensors. A local sensor may be any sensor mounted to electric vehicle 112 that senses objects or events in the environment around electric vehicle 112. Local sensor may include, without limitation, a device that performs radio detection and ranging (RADAR), a device that performs lidar, a device that performs sound navigation ranging (SONAR), an optical device such as a camera, electro-optical (EO) sensors that produce images that mimic human sight, or the like. In one or more embodiments, sensor 108 may include a navigation sensor. For example, and without limitation, a navigation system of an electric vehicle may be provided that is configured to determine a geographical position of the electric vehicle, such as a geographical position of an electric aircraft during flight. The navigation may include a Global Positioning System (GPS), an Attitude Heading and Reference System (AHRS), an Inertial Reference System (IRS), radar system, and the like.

In one or more embodiments, sensor array 108 may include various other types of sensors configured to detect a physical phenomenon related to electric vehicle 112. For instance, a sensor array may include a plurality of similar or different types of photoelectric sensors, similar or different types of pressure sensors, similar or different types of radiation sensors, similar or different types of force sensors, and the like. Sensors of a sensor array may include contact sensors, non-contact sensors, or a combination thereof. In one or more embodiments, sensor suite 200 may include digital sensors, analog sensors, or a combination thereof. Sensor suite 200 may include digital-to-analog converters (DAC), analog-to-digital converters (ADC, A/D, A-to-D), a combination thereof, or other signal conditioning components used in transmission of measurement data to a destination, such as controller 120, over a wireless and/or wired connection.

Figure 3:
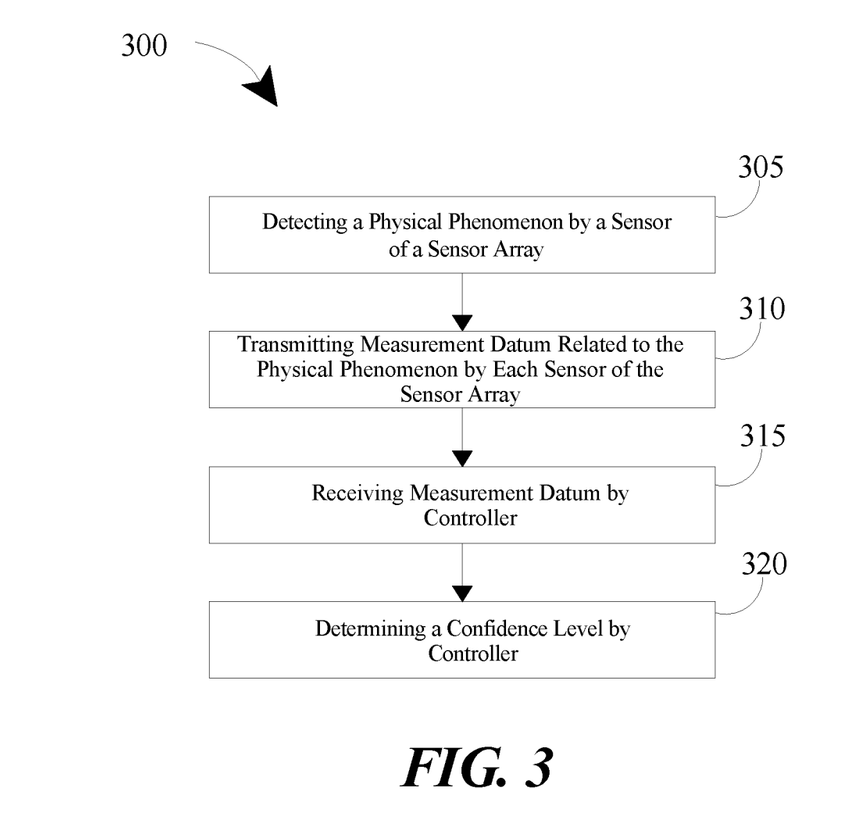
FIG. 3 is a flow chart of an exemplary embodiment of a method of determining a confidence level of a sensor measurement of a sensor in one or more aspects of the present disclosure.

Referring now to FIG. 3, a flow chart showing an exemplary method 300 of determining a confidence level of a sensor measurement by a sensor of an electric vehicle is shown in accordance with one or more embodiments of the present disclosure. As shown in step 305, method 300 includes detecting, by a plurality of sensors 104a-n of sensor array 108 that is attached to electric vehicle 112, a physical phenomenon. Sensors 104a-n may be configured to detect the same physical phenomenon at the same time. In some embodiments, sensors 104a-n may be the same types of sensors. For example, and without limitation, sensors 104a-n may all be voltmeters detecting a voltage of, for example, a battery of electric vehicle 112, at the same point in time. In other embodiments, sensors may be various types of sensors configured to detect the same physical phenomenon. For example, and without limitation, sensors 104a-n may include resistive type sensors and capacitive type sensors to detect voltage of an electrical component, such as a battery of electric vehicle 112.

As shown in step 310, method 300 includes transmitting, by each sensor 104a-n of sensor array 108, measurement datum 116 related to the physical phenomenon. Sensors 104a-n may each be communicatively connected to controller 120. A communicative connection may include a wired or wireless connection. In a non-limiting embodiment, each sensor 104a-n and controller 120 may communicate via a controller area network (CAN) communication.

As shown in step 315, method 300 includes receiving, by controller 120 of electric aircraft 112, measurement datum 116a-n from each sensor 104a-n of sensor array 108. In one or more embodiments, measurement datum 116a-n may include a numerical value representing the detected physical phenomenon. For example, and without limitation, measurement datum is a numerical value representing a temperature of a battery cell of a battery of the electric vehicle, such as 75° F.

As shown in step 320, method 300 includes determining, by controller 120, a confidence level of each sensor 104a-n of sensor array 108 by comparing measurement datum 116 of each sensor 104a-n of sensor array 108 to measurement datum 116 of the other sensors 104a-n of sensor array 108. In one or more embodiments, method 300 may further include determining, by the controller, a confidence level of a second sensor of the sensor array by comparing a second measurement datum of the second sensor to the measurement datum of the other sensors of the sensor array. In one or more embodiments method 300 further includes showing, by a display 128 communicatively connected to controller 120, a confidence level of a first sensor of a sensor array. In one or more embodiments, method 300 further includes identifying, by controller 120, a detection time of each sensor 104a-n, such as of a first sensor 104a. For example, and without limitation, a detection time of a sensor may be taken into consideration when determining a confidence level of a sensor. Furthermore, acquisition circuitry of each sensor may be taken into consideration when determining a confidence level of a sensor. For example, and without limitation, a detection time may be increased due to physical limitations of components of and/or attached to sensors 104a-n. In one or more embodiments, method 300 may further include a method of identifying, by controller 120, a state of a sensor as a function of the confidence level of the sensor. In one or more embodiments, a state may include a condition of a sensor, such as "malfunctioning" or "operational". For instance, and without limitation, if a confidence level of a sensor 104a-n exceeds a predetermined threshold, sensor 104a-n may be identified as a malfunctioning sensor. In other embodiments, if a confidence level of a sensor 104a-n is within a predetermined threshold, sensor 104a-n may be identified as an operational sensor. In one or more embodiments, if the confidence level of a sensor 104a-n is outside a predetermined threshold, then controller 120 may notify a user via display 128.

Figure 4:
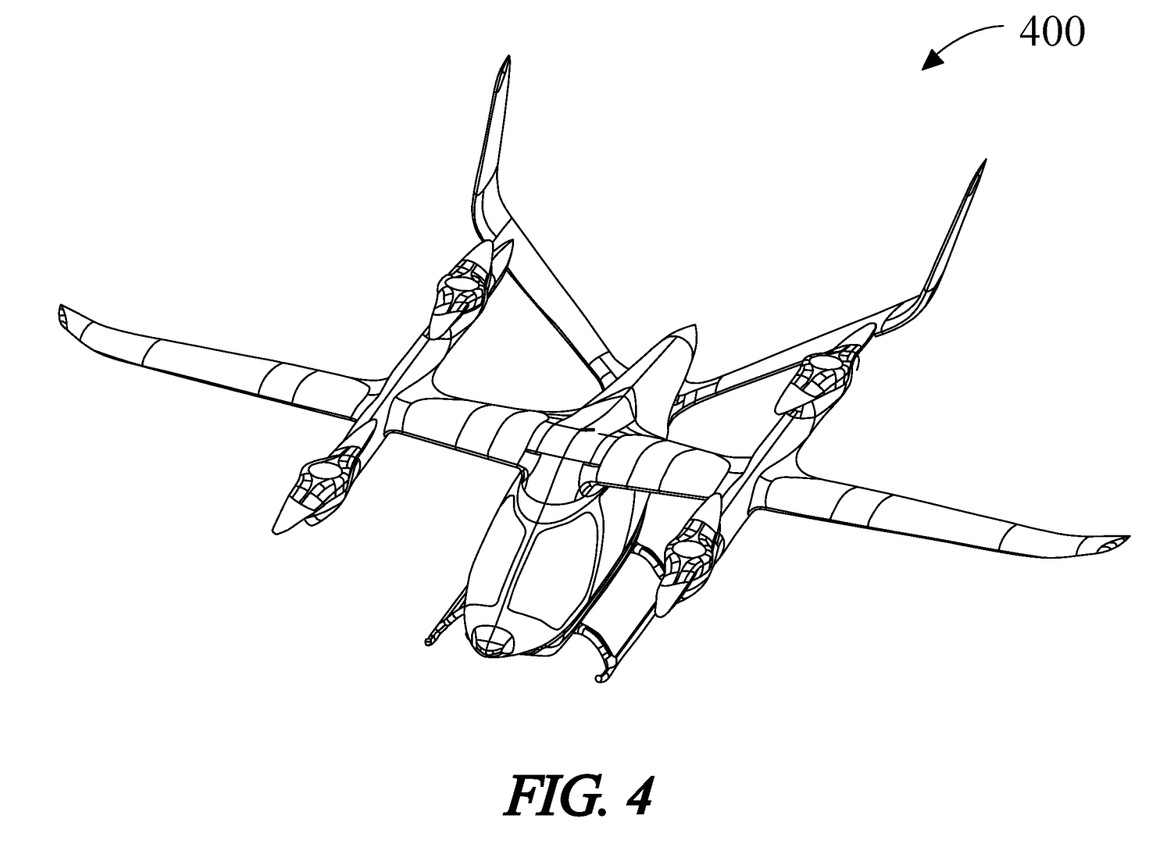
FIG. 4 is an illustration of an embodiment of an electric aircraft in one or more aspect of the present disclosure.

Referring now to FIG. 4, an exemplary embodiment of an electric aircraft 400 is presented in accordance with one or more embodiments of the present disclosure. In one or more embodiments, an electric vehicle may include an electric aircraft, such as electric aircraft 400. Electric aircraft 400 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

Figure 5:
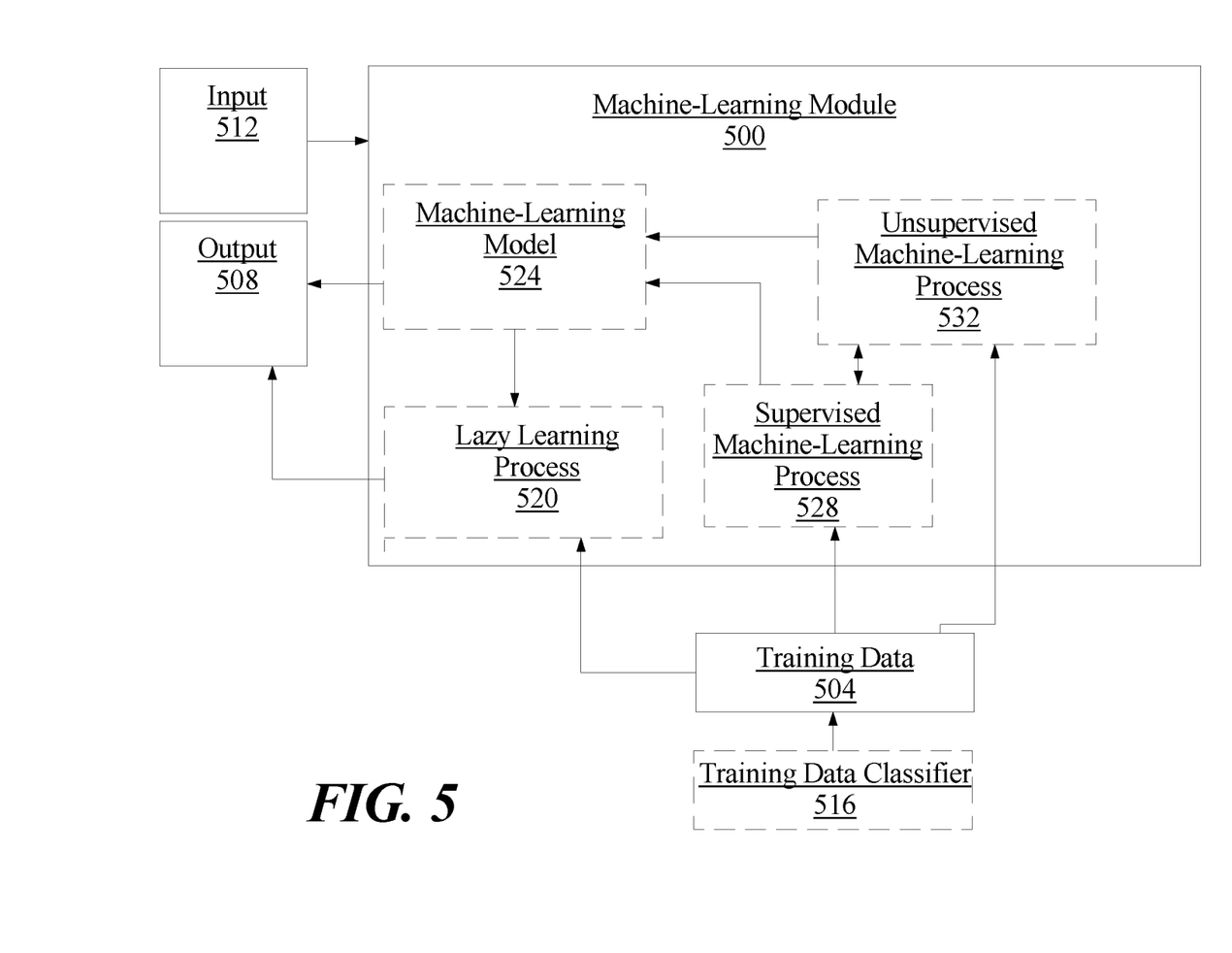
FIG. 5 is an illustration of an exemplary embodiment of a machine-learning model in in one or more aspect of the present disclosure.

Now referring to FIG. 5, an exemplary embodiment of a machine-learning module 500 is shown in accordance with one or more embodiments of the present disclosure. In one or more embodiments, controller 120 may implement a machine-learning process to determine a confidence level of a sensor. In one or more embodiments, machine-learning module 500 may perform one or more machine-learning processes as described in this disclosure is illustrated. Machine-learning module may perform determinations, classification, and/or analysis steps, methods, processes, or the like as described in this disclosure using machine learning processes. A "machine-learning process," as used in this disclosure, is a process that automatedly uses training data 504 to generate an algorithm that will be performed by a computing device/module to produce outputs 508 given data provided as inputs 512; this is in contrast to a non-machine learning software program where the commands to be executed are determined in advance by a user and written in a programming language.

Still referring to FIG. 5, "training data," as used herein, is data containing correlations that a machine-learning process may use to model relationships between two or more categories of data elements. For instance, and without limitation, training data 504 may include a plurality of data entries, each entry representing a set of data elements that were recorded, received, and/or generated together; data elements may be correlated by shared existence in a given data entry, by proximity in a given data entry, or the like. Multiple data entries in training data 504 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 504 according to various correlations; correlations may indicate causative and/or predictive links between categories of data elements, which may be modeled as relationships such as mathematical relationships by machine-learning processes as described in further detail below. Training data 504 may be formatted and/or organized by categories of data elements, for instance by associating data elements with one or more descriptors corresponding to categories of data elements. As a non-limiting example, training data 504 may include data entered in standardized forms by persons or processes, such that entry of a given data element in a given field in a form may be mapped to one or more descriptors of categories. Elements in training data 504 may be linked to descriptors of categories by tags, tokens, or other data elements; for instance, and without limitation, training data 504 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 5, training data 504 may include one or more elements that are not categorized; that is, training data 504 may not be formatted or contain descriptors for some elements of data. Machine-learning algorithms and/or other processes may sort training data 504 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 504 to be made applicable for two or more distinct machine-learning algorithms as described in further detail below. Training data 504 used by machine-learning module 500 may correlate any input data as described in this disclosure to any output data as described in this disclosure. As a non-limiting illustrative example flight elements and/or pilot signals may be inputs, wherein an output may be an autonomous function.

Further referring to FIG. 5, training data may be filtered, sorted, and/or selected using one or more supervised and/or unsupervised machine-learning processes and/or models as described in further detail below; such models may include without limitation a training data classifier 516. Training data classifier 516 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 500 may generate a classifier using a classification algorithm, defined as a processes whereby a computing device and/or any module and/or component operating thereon derives a classifier from training data 504. Classification may be performed using, without limitation, linear classifiers such as without limitation logistic regression and/or naïve Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 5, machine-learning module 500 may be configured to perform a lazy-learning process 520 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 504. Heuristic may include selecting some number of highest-ranking associations and/or training data 504 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 5, machine-learning processes as described in this disclosure may be used to generate machine-learning models 524. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 524 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 524 may be generated by creating an artificial neural network, such as a convolutional neural network comprising an input layer of nodes, one or more intermediate layers, and an output layer of nodes. Connections between nodes may be created via the process of "training" the network, in which elements from a training data 504 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 5, machine-learning algorithms may include at least a supervised machine-learning process 528. At least a supervised machine-learning process 528, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 504. Persons skilled in the art, upon reviewing the entirety of this disclosure, will be aware of various possible variations of at least a supervised machine-learning process 528 that may be used to determine relation between inputs and outputs. Supervised machine-learning processes may include classification algorithms as defined above.

Further referring to FIG. 5, machine learning processes may include at least an unsupervised machine-learning processes 532. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 5, machine-learning module 500 may be designed and configured to create a machine-learning model 524 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 5, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 6:
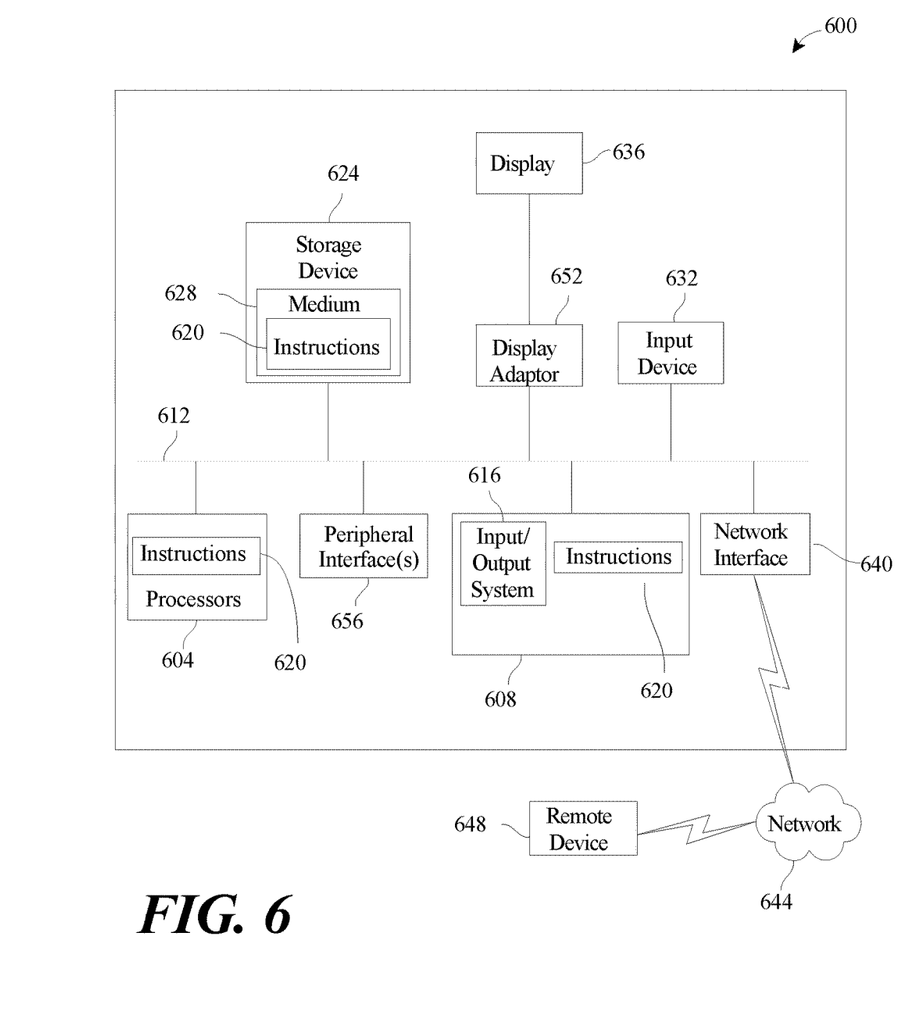
FIG. 6 is a block diagram of a computing system that can be used to implement any one or more of the methodologies disclosed herein and any one or more portions thereof.

FIG. 6 shows a diagrammatic representation of one embodiment of a computing device in the exemplary form of a computer system 600 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 600 includes a processor 604 and a memory 608 that communicate with each other, and with other components, via a bus 612. Bus 612 may include any of several types of bus structures including, but not limited to, a memory bus, a memory controller, a peripheral bus, a local bus, and any combinations thereof, using any of a variety of bus architectures.

Memory 608 may include various components (e.g., machine-readable media) including, but not limited to, a random-access memory component, a read only component, and any combinations thereof. In one example, a basic input/output system 616 (BIOS), including basic routines that help to transfer information between elements within computer system 600, such as during start-up, may be stored in memory 608. Memory 608 may also include (e.g., stored on one or more machine-readable media) instructions (e.g., software) 620 embodying any one or more of the aspects and/or methodologies of the present disclosure. In another example, memory 608 may further include any number of program modules including, but not limited to, an operating system, one or more application programs, other program modules, program data, and any combinations thereof.

Computer system 600 may also include a storage device 624. Examples of a storage device (e.g., storage device 624) include, but are not limited to, a hard disk drive, a magnetic disk drive, an optical disc drive in combination with an optical medium, a solid-state memory device, and any combinations thereof. Storage device 624 may be connected to bus 612 by an appropriate interface (not shown). Example interfaces include, but are not limited to, SCSI, advanced technology attachment (ATA), serial ATA, universal serial bus (USB), IEEE 694 (FIREWIRE), and any combinations thereof. In one example, storage device 624 (or one or more components thereof) may be removably interfaced with computer system 600 (e.g., via an external port connector (not shown)). Particularly, storage device 624 and an associated machine-readable medium 628 may provide nonvolatile and/or volatile storage of machine-readable instructions, data structures, program modules, and/or other data for computer system 600. In one example, software 620 may reside, completely or partially, within machine-readable medium 628. In another example, software 620 may reside, completely or partially, within processor 604.

Computer system 600 may also include an input device 632. In one example, a user of computer system 600 may enter commands and/or other information into computer system 600 via input device 632. Examples of an input device 632 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 632 may be interfaced to bus 612 via any of a variety of interfaces (not shown) including, but not limited to, a serial interface, a parallel interface, a game port, a USB interface, a FIRE-WIRE interface, a direct interface to bus 612, and any combinations thereof. Input device 632 may include a touch screen interface that may be a part of or separate from display 636, discussed further below. Input device 632 may be utilized as a user selection device for selecting one or more graphical representations in a graphical interface as described above.

A user may also input commands and/or other information to computer system 600 via storage device 624 (e.g., a removable disk drive, a flash drive, etc.) and/or network interface device 640. A network interface device, such as network interface device 640, may be utilized for connecting computer system 600 to one or more of a variety of networks, such as network 644, and one or more remote devices 648 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 644, may employ a wired and/or a wireless mode of communication. In general, any network topology may be used. Information (e.g., data, software 620, etc.) may be communicated to and/or from computer system 600 via network interface device 640.

Computer system 600 may further include a video display adapter 652 for communicating a displayable image to a display device, such as display device 636. Examples of a display device include, but are not limited to, a liquid crystal display (LCD), a cathode ray tube (CRT), a plasma display, a light emitting diode (LED) display, and any combinations thereof. Display adapter 652 and display device 636 may be utilized in combination with processor 604 to provide graphical representations of aspects of the present disclosure. In addition to a display device, computer system. 600 may include one or more other peripheral output devices including, but not limited to, an audio speaker, a printer, and any combinations thereof. Such peripheral output devices may be connected to bus 612 via a peripheral interface 656. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for determining a confidence level of a sensor measurement by a sensor of an electric aircraft, the system comprising:
   a sensor array attached to an electric aircraft and comprising a plurality of sensors of a same type of sensor, wherein each sensor of the sensor array is configured to:
      detect a physical phenomenon associated with the electric aircraft, wherein the physical phenomenon is a temperature of a battery cell of the electric aircraft which is used to power the electric aircraft; and
      transmit a measurement datum related to the physical phenomenon, wherein the measurement datum is a numerical value representing the temperature of the battery cell; and
   a controller, wherein the controller is configured to:
      receive the measurement datum from each sensor of the sensor array; and
      determine a confidence level of a first sensor of the sensor array by comparing a measurement datum of the first sensor of the sensor array to each measurement datum of the other sensors of the sensor array, wherein the confidence level is expressed as a threshold and determining the confidence level comprises:
         calculating an average of each measurement datum of the other sensors of the sensor array;
         comparing the measurement datum from the first sensor to the average of each measurement datum of the other sensors of the sensor array;
         determining a deviation of the first sensor from the average of each measurement datum of the other sensors of the sensor array; and
         determining the confidence level of the first sensor based on the deviation of the first sensor; and
      determine a state of the first sensor as a function of the confidence level of the first sensor.

2. The system of claim 1, wherein the controller is further configured to determine a confidence level of a second sensor of the sensor array by comparing a second measurement datum of the second sensor to the measurement datum of the other sensors of the sensor array.

3. The system of claim 1, further comprising a display configured to show the confidence level of the first sensor of the sensor array.

4. The system of claim 1, wherein determining the confidence level of the first sensor comprises identifying a detection time of the first sensor.

5. The system of claim 1, wherein each sensor comprises an accelerometer.

6. The system of claim 1, wherein the plurality of sensors of the sensor array comprises temperature sensors.

7. The system of claim 1, wherein the confidence level includes a confidence interval.

8. A method for determining a confidence level of a sensor measurement by a sensor of an electric aircraft, the method comprising:
- detecting, by a plurality of sensors of a same type of sensor of a sensor array that is attached to an electric aircraft, a physical phenomenon associated with the electric aircraft, wherein the physical phenomenon is a temperature of a battery cell of the electric aircraft which is used to power the electric aircraft;
- transmitting, by each sensor of the sensor array, a measurement datum related to the physical phenomenon, wherein the measurement datum is a numerical value representing the temperature of the battery cell;
- receiving, by a controller of the electric aircraft, the measurement datum from each sensor of the sensor array;
- determining, by the controller, a confidence level of each sensor of the sensor array by comparing a measurement datum of each sensor of the sensor array to a measurement datum of the other sensors of the sensor array, wherein the confidence level is expressed as a threshold and determining the confidence level comprises:
  - calculating, by the controller, an average of the measurement datum of the sensors of the sensor array;
  - comparing, by the controller, the measurement datum from each sensor to the average of the measurement datum of the other sensors of the sensor array;
  - determining, by the controller, a deviation of each sensor from the average of the measurement datum of the other sensors of the sensor array; and
  - determining, by the controller, the confidence level of each sensor based on the deviation of each sensor; and
- determining, by the controller, a state of the sensor array as a function of the confidence level of each sensor of the sensor array.

9. The method of claim 8, further comprising determining, by the controller, a confidence level of a second sensor of the sensor array by comparing a second measurement datum of the second sensor to the measurement datum of the other sensors of the sensor array.

10. The method of claim 8, further comprising showing, by a display communicatively connected to the controller, the confidence level of a first sensor of the sensor array.

11. The method of claim 8, further comprising identifying, by the controller, a detection time of a first sensor of the sensor array.

12. The method of claim 8, wherein each sensor comprises an accelerometer.

13. The method of claim 8, wherein the plurality of sensors of the sensor array comprises temperature sensors.

14. The method of claim 8, wherein the confidence level includes a confidence interval.

15. A system for determining a confidence level of a sensor measurement by a sensor of an electric aircraft, the system comprising:
- a sensor array attached to an electric aircraft and comprising a plurality of sensors of a same type of sensor, wherein each sensor of the sensor array is configured to:
  - detect a physical phenomenon associated with the electric aircraft, wherein the physical phenomenon is associated with a cell failure of a battery cell of the electric aircraft which is used to power the electric aircraft; and
  - transmit a measurement datum related to the physical phenomenon, wherein the measurement datum includes detection of a presence of a byproduct discharge from the battery cell which is indicative of the cell failure; and
- a controller, wherein the controller is configured to:
  - receive the measurement datum from each sensor of the sensor array; and
  - determine a confidence level of a first sensor of the sensor array by comparing a measurement datum of the first sensor of the sensor array to each measurement datum of the other sensors of the sensor array, wherein the confidence level is expressed as a threshold and determining the confidence level comprises:
    - calculating an average of each measurement datum of the other sensors of the sensor array;
    - comparing the measurement datum from the first sensor to the average of each measurement datum of the other sensors of the sensor array;
    - determining a deviation of the first sensor from the average of each measurement datum of the other sensors of the sensor array; and
    - determining the confidence level of the first sensor based on the deviation of the first sensor; and
  - determine a state of the first sensor as a function of the confidence level of the first sensor.

16. The system of claim 15, wherein the first sensor comprises a gas sensor configured to detect a gaseous byproduct of the cell failure.

17. The system of claim 15, wherein the first sensor is configured to detect a non-gaseous byproduct of the cell failure.

* * * * *